US011087762B2

(12) United States Patent
Gao et al.

(10) Patent No.: US 11,087,762 B2
(45) Date of Patent: Aug. 10, 2021

(54) CONTEXT-SENSITIVE DYNAMIC UPDATE OF VOICE TO TEXT MODEL IN A VOICE-ENABLED ELECTRONIC DEVICE

(71) Applicant: Google LLC, Mountain View, CA (US)

(72) Inventors: Yuli Gao, Sunnyvale, CA (US); Sangsoo Sung, Palo Alto, CA (US); Prathab Murugesan, Mountain View, CA (US)

(73) Assignee: GOOGLE LLC, Mountain View, CA (US)

(*) Notice: Subject to any disclaimer, the term of this patent is extended or adjusted under 35 U.S.C. 154(b) by 0 days.

(21) Appl. No.: 16/665,309

(22) Filed: Oct. 28, 2019

(65) Prior Publication Data

US 2020/0058304 A1 Feb. 20, 2020

Related U.S. Application Data

(63) Continuation of application No. 15/969,291, filed on May 2, 2018, now Pat. No. 10,482,883, which is a (Continued)

(51) Int. Cl.
*G10L 15/26* (2006.01)
*G10L 15/22* (2006.01)
(Continued)

(52) U.S. Cl.
CPC .............. *G10L 15/26* (2013.01); *G10L 15/22* (2013.01); *G10L 15/065* (2013.01);
(Continued)

(58) Field of Classification Search
CPC ...... G10L 15/265; G10L 15/02; G10L 15/063; G10L 15/187; G10L 15/22; G10L 15/30;
(Continued)

(56) References Cited

U.S. PATENT DOCUMENTS 5,092,919 A   3/1992 Nguyen
5,857,099 A * 1/1999 Mitchell ............... G10L 15/22
                                                       704/235
(Continued)

FOREIGN PATENT DOCUMENTS

CN   1408182   4/2003
CN   1786952   6/2006
(Continued)

OTHER PUBLICATIONS

International Search Report and Written Opinion of PCT Serial No. PCT/US16/033657 dated Jul. 19, 2016.
(Continued)

*Primary Examiner* — Anne L Thomas-Homescu
(74) *Attorney, Agent, or Firm* — Middleton Reutlinger

(57) ABSTRACT

A voice to text model used by a voice-enabled electronic device is dynamically and in a context-sensitive manner updated to facilitate recognition of entities that potentially may be spoken by a user in a voice input directed to the voice-enabled electronic device. The dynamic update to the voice to text model may be performed, for example, based upon processing of a first portion of a voice input, e.g., based upon detection of a particular type of voice action, and may be targeted to facilitate the recognition of entities that may occur in a later portion of the same voice input, e.g., entities that are particularly relevant to one or more parameters associated with a detected type of voice action.

20 Claims, 5 Drawing Sheets

US 11,087,762 B2
Page 2

Related U.S. Application Data continuation of application No. 14/723,250, filed on May 27, 2015, now Pat. No. 9,966,073.

(51) Int. Cl.
- *G10L 15/065* (2013.01)
- *G10L 15/18* (2013.01)
- *G10L 15/08* (2006.01)

(52) U.S. Cl.
CPC ........ *G10L 15/083* (2013.01); *G10L 15/1822* (2013.01); *G10L 2015/223* (2013.01); *G10L 2015/228* (2013.01)

(58) Field of Classification Search
CPC .............. G11C 2207/16; G06F 17/289; G06F 17/2785; G06F 17/2735; H04M 3/53325; H04M 3/533; H04M 3/5307
See application file for complete search history.

(56) References Cited

U.S. PATENT DOCUMENTS

| | | | |
|---|---|---|---|
| 6,092,919 A * | 7/2000 | Calise | G05D 1/0825 244/194 |
| 6,215,879 B1 | 4/2001 | Dempsey | |
| 6,421,607 B1 * | 7/2002 | Gee | G01C 21/3608 340/988 |
| 6,442,520 B1 * | 8/2002 | Buhrke | G10L 15/08 704/251 |
| 6,678,415 B1 * | 1/2004 | Popat | G06K 9/72 382/226 |
| 6,751,595 B2 | 6/2004 | Busayapongchai et al. | |
| 6,779,030 B1 * | 8/2004 | Dugan | H04M 3/42136 379/221.08 |
| 6,856,960 B1 * | 2/2005 | Dragosh | G10L 15/30 704/243 |
| 7,197,331 B2 * | 3/2007 | Anastasakos | G10L 15/30 455/550.1 |
| 7,233,786 B1 * | 6/2007 | Harris | H04L 67/04 455/412.1 |
| 7,606,708 B2 * | 10/2009 | Hwang | G10L 15/06 704/257 |
| 7,653,191 B1 * | 1/2010 | Glasser | H04L 65/104 379/201.1 |
| 7,689,420 B2 * | 3/2010 | Paek | G10L 15/19 704/257 |
| 7,697,509 B2 | 4/2010 | Freitag et al. | |
| 7,729,913 B1 * | 6/2010 | Lee | G10L 15/26 704/254 |
| 8,195,468 B2 * | 6/2012 | Weider | G06F 16/951 704/275 |
| 8,209,184 B1 * | 6/2012 | Dragosh | H04M 3/4936 704/270.1 |
| 8,391,320 B2 | 3/2013 | Lubbs et al. | |
| 8,396,710 B2 * | 3/2013 | White | G10L 15/30 704/244 |
| 8,447,607 B2 * | 5/2013 | Weider | G06F 16/951 704/250 |
| 8,494,853 B1 * | 7/2013 | Mengibar | G10L 15/065 704/235 |
| 8,868,409 B1 * | 10/2014 | Mengibar | G06F 40/30 704/9 |
| 8,949,130 B2 * | 2/2015 | Phillips | G10L 15/30 704/270 |
| 9,172,803 B2 | 10/2015 | Bachran et al. | |
| 9,460,713 B1 * | 10/2016 | Moreno Mengibar | G10L 15/24 |
| 9,620,122 B2 * | 4/2017 | VanBlon | G10L 15/32 |
| 9,691,390 B2 * | 6/2017 | Stonehocker | G10L 15/063 |
| 9,773,498 B2 * | 9/2017 | Stern | G10L 15/183 |
| 2002/0042707 A1 * | 4/2002 | Zhao | G06F 40/20 704/9 |
| 2002/0169600 A1 * | 11/2002 | Busayapongchai | G10L 15/22 704/201 |
| 2003/0120493 A1 * | 6/2003 | Gupta | G10L 15/063 704/270.1 |
| 2004/0044516 A1 * | 3/2004 | Kennewick | G10L 15/22 704/5 |
| 2004/0243419 A1 * | 12/2004 | Wang | G10L 15/22 704/277 |
| 2005/0027527 A1 * | 2/2005 | Junkawitsch | G10L 15/20 704/243 |
| 2005/0043953 A1 * | 2/2005 | Winterkamp | G10L 15/22 704/275 |
| 2005/0187771 A1 * | 8/2005 | Gong | G10L 15/142 704/256.6 |
| 2006/0093998 A1 * | 5/2006 | Vertegaal | H04N 7/18 434/236 |
| 2007/0142027 A1 * | 6/2007 | Bushnell | H04M 3/4874 455/404.1 |
| 2007/0276651 A1 * | 11/2007 | Bliss | G10L 15/30 704/9 |
| 2007/0288159 A1 * | 12/2007 | Skelton | G06F 16/29 455/556.2 |
| 2009/0030697 A1 * | 1/2009 | Cerra | G10L 15/30 704/275 |
| 2009/0053681 A1 * | 2/2009 | Shen | G09B 19/06 434/157 |
| 2009/0077191 A1 * | 3/2009 | Bristow | H04L 51/36 709/207 |
| 2009/0119009 A1 * | 5/2009 | Dicke | G01C 21/26 701/533 |
| 2009/0187410 A1 * | 7/2009 | Wilpon | G10L 15/30 704/270.1 |
| 2009/0210148 A1 * | 8/2009 | Jayanthi | H04W 4/50 701/467 |
| 2009/0220926 A1 * | 9/2009 | Rechlis | G10L 15/07 434/185 |
| 2010/0088100 A1 * | 4/2010 | Lindahl | G10L 15/30 704/270.1 |
| 2010/0153335 A1 * | 6/2010 | Esteve Balducci | G06Q 10/107 707/610 |
| 2010/0158218 A1 * | 6/2010 | Dhawan | H04M 1/2478 379/88.18 |
| 2010/0172287 A1 * | 7/2010 | Krieter | H04W 8/005 370/328 |
| 2010/0299376 A1 * | 11/2010 | Batchu | G06F 16/24573 707/805 |
| 2011/0015928 A1 * | 1/2011 | Odell | G10L 15/30 704/257 |
| 2011/0044435 A1 * | 2/2011 | Bachran | H04M 3/493 379/88.17 |
| 2011/0112827 A1 * | 5/2011 | Kennewick | G10L 15/18 704/9 |
| 2011/0112921 A1 * | 5/2011 | Kennewick | G06Q 30/0601 705/26.1 |
| 2011/0286586 A1 * | 11/2011 | Saylor | H04M 3/42059 379/88.13 |
| 2012/0089698 A1 * | 4/2012 | Tseng | G06Q 10/101 709/217 |
| 2012/0179457 A1 * | 7/2012 | Newman | G10L 15/32 704/201 |
| 2012/0215539 A1 * | 8/2012 | Juneja | G10L 25/60 704/254 |
| 2012/0245934 A1 * | 9/2012 | Talwar | G10L 15/22 704/235 |
| 2012/0253799 A1 * | 10/2012 | Bangalore | G10L 15/183 704/231 |
| 2013/0030802 A1 * | 1/2013 | Jia | G10L 15/06 704/231 |
| 2013/0085753 A1 * | 4/2013 | Bringert | G10L 15/32 704/233 |
| 2013/0132089 A1 * | 5/2013 | Fanty | G10L 15/30 704/270 |
| 2013/0151250 A1 * | 6/2013 | VanBlon | G10L 15/30 704/235 |
| 2013/0179154 A1 * | 7/2013 | Okuno | G10L 15/32 704/10 |

(56) References Cited

U.S. PATENT DOCUMENTS

| | | | |
|---|---|---|---|
| 2013/0246392 A1* | 9/2013 | Farmaner | G06F 16/90332 707/713 |
| 2013/0325450 A1* | 12/2013 | Levien | G10L 15/065 704/201 |
| 2013/0332162 A1* | 12/2013 | Keen | G06F 40/10 704/235 |
| 2014/0025380 A1* | 1/2014 | Koch | G10L 15/1822 704/257 |
| 2014/0036022 A1* | 2/2014 | Croen | H04N 7/147 348/14.01 |
| 2014/0039893 A1* | 2/2014 | Weiner | G10L 15/22 704/249 |
| 2014/0052453 A1* | 2/2014 | Koivuniemi | H04N 21/4622 704/275 |
| 2014/0053209 A1* | 2/2014 | Young | G06F 3/167 725/53 |
| 2014/0053210 A1* | 2/2014 | Cheong | H04N 21/4622 725/53 |
| 2014/0058732 A1* | 2/2014 | Labsky | G10L 15/30 704/254 |
| 2014/0067392 A1* | 3/2014 | Burke | G10L 15/30 704/236 |
| 2014/0088731 A1* | 3/2014 | Von Hauck | H04W 12/1206 700/14 |
| 2014/0129226 A1* | 5/2014 | Lee | G10L 15/04 704/254 |
| 2014/0163977 A1* | 6/2014 | Hoffmeister | G10L 15/32 704/232 |
| 2014/0169539 A1* | 6/2014 | Mumick | H04M 3/48 379/88.23 |
| 2014/0180697 A1* | 6/2014 | Torok | G06F 16/685 704/275 |
| 2014/0288936 A1* | 9/2014 | Cho | G10L 15/30 704/257 |
| 2014/0320284 A1* | 10/2014 | Messenger | G08B 25/008 340/527 |
| 2014/0324745 A1* | 10/2014 | Leppanen | G06Q 10/06 706/12 |
| 2014/0337007 A1* | 11/2014 | Waibel | G10L 13/02 704/3 |
| 2014/0358544 A1* | 12/2014 | Printz | G10L 15/19 704/254 |
| 2015/0066504 A1 | 3/2015 | Iannone et al. | |
| 2015/0081630 A1* | 3/2015 | Linsalata | G06Q 50/01 707/617 |
| 2015/0120287 A1* | 4/2015 | Stern | G10L 15/183 704/231 |
| 2015/0120288 A1* | 4/2015 | Thomson | G10L 15/22 704/231 |
| 2015/0120296 A1* | 4/2015 | Stern | G10L 15/30 704/236 |
| 2015/0133082 A1* | 5/2015 | Broch | H04W 12/0802 455/410 |
| 2015/0186892 A1* | 7/2015 | Zhang | G06Q 20/4016 705/44 |
| 2015/0254518 A1* | 9/2015 | Griffin | H04M 1/72552 382/229 |
| 2015/0255068 A1* | 9/2015 | Kim | G10L 17/04 704/246 |
| 2015/0279352 A1* | 10/2015 | Willett | G10L 19/0017 704/231 |
| 2015/0293509 A1* | 10/2015 | Bankowski | G05B 15/02 700/275 |
| 2015/0370787 A1* | 12/2015 | Akbacak | G06F 40/44 704/2 |
| 2015/0371628 A1* | 12/2015 | Kreifeldt | G10L 15/02 704/254 |
| 2015/0373183 A1* | 12/2015 | Woolsey | H04M 1/7255 348/14.08 |
| 2015/0379987 A1* | 12/2015 | Panainte | G10L 15/32 704/246 |
| 2016/0027435 A1* | 1/2016 | Pinto | G10L 15/26 704/244 |
| 2016/0042748 A1* | 2/2016 | Jain | G10L 15/22 704/9 |
| 2016/0328270 A1* | 11/2016 | Bikkula | G06F 3/038 |
| 2016/0350320 A1* | 12/2016 | Sung | G10L 15/30 |
| 2017/0256264 A1* | 9/2017 | Stonehocker | G10L 15/08 |
| 2017/0263253 A1 | 9/2017 | Thomson et al. | |

FOREIGN PATENT DOCUMENTS

| | | |
|---|---|---|
| CN | 101034390 | 9/2007 |
| CN | 101149923 | 3/2008 |
| CN | 101604204 | 12/2009 |
| CN | 101828197 | 9/2010 |
| CN | 101938522 | 1/2011 |
| CN | 102148030 | 8/2011 |
| CN | 102215233 | 10/2011 |
| CN | 102243871 | 11/2011 |
| CN | 102812450 | 5/2012 |
| CN | 102496364 | 6/2012 |
| CN | 103038818 | 4/2013 |
| CN | 103400576 | 11/2013 |
| CN | 104429039 | 3/2015 |
| CN | 104462262 | 3/2015 |
| CN | 104751843 | 7/2015 |
| JP | 06259090 | 9/1994 |
| JP | 2004355629 | 12/2004 |
| JP | 2005284880 A | 10/2005 |
| JP | 2011124629 | 6/2011 |
| JP | 2013021691 | 1/2013 |
| JP | 2013510341 | 3/2013 |
| JP | 2013140269 | 7/2013 |
| JP | 2013529794 | 7/2013 |
| KR | 100695127 B1 | 3/2007 |
| WO | 9416435 | 7/1994 |
| WO | 2006037219 | 4/2006 |
| WO | 2009082684 | 7/2009 |
| WO | 2009145796 | 12/2009 |
| WO | 2014055076 | 4/2014 |
| WO | 2014060054 | 4/2014 |
| WO | 2014144579 | 9/2014 |
| WO | 2015041892 | 3/2015 |

OTHER PUBLICATIONS

Kumar Anuj et al.; Enabling the Rapid Development and Adoption of Speech-User Interfaces; Computer, IEEE, US vol. 47-1; pp. 40-47; dated Jan. 1, 2014.

Kuhn T. et al.; Hybrid in-car Speech Recognition for Mobile Multimedia Applications; Vehicular Technology Conference, IEEE, dated May 20, 1999.

European Patent Office; Examination Report of Application No. 16727080.0, 4 pages, dated Oct. 24, 2018 Oct. 24, 2018.

China National Intellectual Property Administration; Notice of Grant issued in Application No. 201680018124.X dated Jan. 14, 2019. Jan. 14, 2019.

The Korean Intellectual Property Office; Office Action issued in Application No. 10-2017-7027560 dated Jan. 7, 2019. Jan. 7, 2019.

U.S. Appl. No. 62/015,879, filed Jun. 23, 2014 (Kreifeldt provisional) Jun. 23, 2014.

European Patent Office; Summons issued in Application No. 16727080.0 dated Jun. 14, 2019 Jun. 14, 2019.

China National Intellectual Property Administration; First Office Action issue for Application No. 201680018917.1; dated Mar. 10, 2020.

Kumar et al.; Enabling the Rapid Development and Adoption of Speech-User Interfaces; Computer, vol. 47(1); dated 2014.

China National Intellectual Property Administration; Notification for Patent Registration Formalities issue in Application No. 201680018917.1; 9 pages; dated Aug. 20, 2020.

Bang J. et al.; Pronunciation Variants Prediction Method to Detect Mispronunciations by Korean Learners of English; abstract retrieved Sep. 2020; 2 pages; dated Dec. 2014.

(56) References Cited

OTHER PUBLICATIONS

Tamjis, M. R. et al; Heterogeneous Speech Prediction Using LDA Classifiers; abstract retrieved Sep. 2020; 2 pages; dated Aug. 2014.

Xiaoqing, Gu et al.; Go beyond the Fragmentation: Semantic Diagram and Deep Learning; Department of Education Information Techology; English abstract—2 pages; dated Mar. 13, 2015.

Xueyun Yang, et al.;Research on Listening and Discrimination of English Language Flow Information Based on Speech Perception Model; English abstract—3 pages; dated Jan. 31, 2014.

* cited by examiner

CONTEXT-SENSITIVE DYNAMIC UPDATE OF VOICE TO TEXT MODEL IN A VOICE-ENABLED ELECTRONIC DEVICE

BACKGROUND

Voice-based user interfaces are increasingly being used in the control of computers and other electronic devices. One particularly useful application of a voice-based user interface is with portable electronic devices such as mobile phones, watches, tablet computers, head-mounted devices, virtual or augmented reality devices, etc. Another useful application is with vehicular electronic systems such as automotive systems that incorporate navigation and audio capabilities. Such applications are generally characterized by non-traditional form factors that limit the utility of more traditional keyboard or touch screen inputs and/or usage in situations where it is desirable to encourage a user to remain focused on other tasks, such as when the user is driving or walking.

Voice-based user interfaces have continued to evolve from early rudimentary interfaces that could only understand simple and direct commands to more sophisticated interfaces that respond to natural language requests and that can understand context and manage back-and-forth dialogs or conversations with users. Many voice-based user interfaces incorporate both an initial speech-to-text (or voice-to-text) conversion that converts an audio recording of a human voice to text, and a semantic analysis that analysis the text in an attempt to determine the meaning of a user's request. Based upon a determined meaning of a user's recorded voice, an action may be undertaken such as performing a search or otherwise controlling a computer or other electronic device.

The computing resource requirements of a voice-based user interface, e.g., in terms of processor and/or memory resources, can be substantial, and as a result, some conventional voice-based user interface approaches employ a client-server architecture where voice input is received and recorded by a relatively low-power client device, the recording is transmitted over a network such as the Internet to an online service for speech-to-text conversion and semantic processing, and an appropriate response is generated by the online service and transmitted back to the client device. Online services can devote substantial computing resources to processing voice input, enabling more complex speech recognition and semantic analysis functionality to be implemented than could otherwise be implemented locally within a client device. However, a client-server approach necessarily requires that a client be online (i.e., in communication with the online service) when processing voice input. Particularly in mobile and automotive applications, continuous online connectivity may not be guaranteed at all times and in all locations, so a client-server voice-based user interface may be disabled in a client device whenever that device is "offline" and thus unconnected to an online service. Furthermore, even when a device is connected to an online service, the latency associated with online processing of a voice input, given the need for bidirectional communications between the client device and the online service, may be undesirably perceptible by a user.

SUMMARY

This specification is directed generally to various implementations that dynamically and in a context-sensitive manner update a voice to text model used by a voice-enabled electronic device to facilitate recognition of entities that potentially may be spoken by a user in a voice input directed to the voice-enabled electronic device. The dynamic update to the voice to text model may be performed, for example, based upon processing of a first portion of a voice input, e.g., based upon detection of a particular type of voice action, and may be targeted to facilitate the recognition of entities that may occur in a later portion of the same voice input, e.g., entities that are particularly relevant to one or more parameters associated with a detected type of voice action.

Therefore, in some implementations, a method may receive a voice input with a voice-enabled electronic device, and in the voice-enabled electronic device, and responsive to receiving at least a portion of the voice input, perform local processing of the at least a portion of the voice input to dynamically build at least a portion of a voice action prior to completely receiving the voice input with the voice-enabled electronic device, determine during the local processing whether the voice action is associated with a context sensitive parameter, and in response to a determination that the voice action is associated with the context sensitive parameter, initiate a dynamic update to a local voice to text model used by the voice-enabled electronic device to facilitate recognition of a plurality of context sensitive entities associated with the context sensitive parameter.

In some implementations, performing the local processing includes converting a digital audio signal of the voice input to text using a streaming voice to text module of the voice-enabled electronic device, where the streaming voice to text module dynamically generates a plurality of text tokens from the digital audio signal, and dynamically building the portion of the voice action from at least a portion of the plurality of text tokens using a streaming semantic processor of the voice-enabled electronic device. In addition, in some implementations determining whether the voice action is associated with the context sensitive parameter is performed by the streaming semantic processor, and initiating the dynamic update to the local voice to text model includes communicating data from the streaming semantic processor to the streaming voice to text module to initiate the dynamic update of the local voice to text model.

In some implementations, the local voice to text model comprises at least one decoding graph, and initiating the dynamic update of the local voice to text model includes adding a decoding path to the at least one decoding graph corresponding to each of the plurality of context sensitive entities. In addition, some implementations include, in response to a determination that the voice action is associated with the context sensitive parameter, prefetching from an online service voice to text model update data associated with the plurality of context sensitive entities, where initiating the dynamic update of the local voice to text model includes communicating the prefetched voice to text model update data to dynamically update the local voice to text model.

Further, in some implementations, determining during the local processing whether the voice action is associated with a context sensitive parameter includes determining whether the voice action is a request to play a media item, where the context sensitive parameter includes a media item identifier for use in identifying the media item, and where the plurality of context sensitive entities identify a plurality of media items playable by the voice-enabled electronic device.

In addition, in some implementations, determining during the local processing whether the voice action is associated with a context sensitive parameter includes determining whether the voice action is a request to communicate with a contact, where the context sensitive parameter includes a contact identifier for use in initiating a communication with the contact, and where the plurality of context sensitive entities identify a plurality of contacts accessible by the voice-enabled electronic device. In some implementations, the context sensitive parameter is a location-dependent parameter, and the plurality of context sensitive entities identify a plurality of points of interest disposed in proximity to a predetermined location, and in some implementations, the predetermined location comprises a current location of the voice-enabled electronic device. Some implementations also, in response to a determination that the voice action is associated with the context sensitive parameter, communicate the current location to an online service and prefetch from the online service voice to text model update data associated with the plurality of context sensitive entities.

In addition, in some implementations, a method may receive a voice input with a voice-enabled electronic device, perform voice to text conversion locally in the voice-enabled electronic device using a local voice to text model to generate text for a first portion of the voice input, dynamically update the local voice to text model after generating the text for the first portion of the voice input to facilitate recognition of a plurality of context sensitive entities associated with a context sensitive parameter for a voice action associated with the voice input, and perform voice to text conversion locally in the voice-enabled electronic device using the dynamically updated local voice to text model to generate text for a second portion of the voice input.

In some implementations, performing the voice to text conversion includes converting a digital audio signal of the voice input to text using a streaming voice to text module of the voice-enabled electronic device, where the streaming voice to text module dynamically generates a plurality of text tokens from the digital audio signal. Such implementations may further include dynamically building at least a portion of the voice action prior to completely receiving the voice input with the voice-enabled electronic device from at least a portion of the plurality of text tokens using a streaming semantic processor of the voice-enabled electronic device. In addition, in some implementations, dynamically updating the local voice to text model is initiated by the streaming semantic processor in response to determining that the voice action is associated with the context sensitive parameter.

In addition, some implementations may include an apparatus including memory and one or more processors operable to execute instructions stored in the memory, where the instructions are configured to perform any of the aforementioned methods. Some implementations may also include a non-transitory computer readable storage medium storing computer instructions executable by one or more processors to perform any of the aforementioned methods.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

DETAILED DESCRIPTION

In the implementations discussed hereinafter, a voice to text model used by a voice-enabled electronic device is dynamically and in a context-sensitive manner updated to facilitate recognition of context sensitive entities that potentially may be spoken by a user in a voice input directed to the voice-enabled electronic device. Further details regarding selected implementations are discussed hereinafter. It will be appreciated however that other implementations are contemplated so the implementations disclosed herein are not exclusive.

Example Hardware and Software Environment

Figure 1:
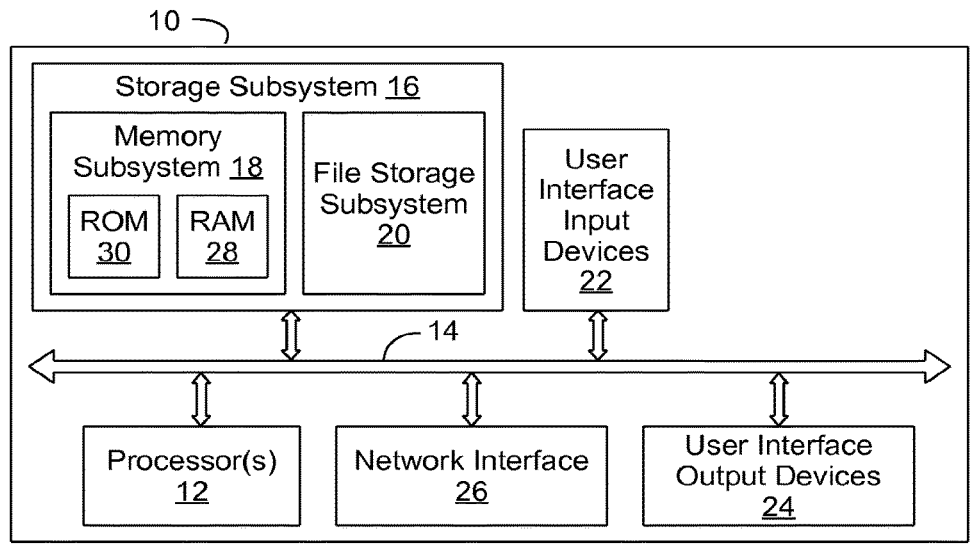
FIG. 1 illustrates an example architecture of a computer system.

Now turning to the Drawings, wherein like numbers denote like parts throughout the several views, FIG. 1 is a block diagram of electronic components in an example computer system 10. System 10 typically includes at least one processor 12 that communicates with a number of peripheral devices via bus subsystem 14. These peripheral devices may include a storage subsystem 16, including, for example, a memory subsystem 18 and a file storage subsystem 20, user interface input devices 22, user interface output devices 24, and a network interface subsystem 26. The input and output devices allow user interaction with system 10. Network interface subsystem 26 provides an interface to outside networks and is coupled to corresponding interface devices in other computer systems.

In some implementations, user interface input devices 22 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computer system 10 or onto a communication network.

User interface output devices 24 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computer system 10 to the user or to another machine or computer system.

Storage subsystem 16 stores programming and data constructs that provide the functionality of some or all of the modules described herein. For example, the storage subsystem 16 may include the logic to perform selected aspects of the methods disclosed hereinafter.

These software modules are generally executed by processor 12 alone or in combination with other processors. Memory subsystem 18 used in storage subsystem 16 may include a number of memories including a main random access memory (RAM) 28 for storage of instructions and data during program execution and a read only memory (ROM) 30 in which fixed instructions are stored. A file storage subsystem 20 may provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 20 in the storage subsystem 16, or in other machines accessible by the processor(s) 12.

Bus subsystem 14 provides a mechanism for allowing the various components and subsystems of system 10 to communicate with each other as intended. Although bus subsystem 14 is shown schematically as a single bus, alternative implementations of the bus subsystem may use multiple busses.

System 10 may be of varying types including a mobile device, a portable electronic device, an embedded device, a desktop computer, a laptop computer, a tablet computer, a wearable device, a workstation, a server, a computing cluster, a blade server, a server farm, or any other data processing system or computing device. In addition, functionality implemented by system 10 may be distributed among multiple systems interconnected with one another over one or more networks, e.g., in a client-server, peer-to-peer, or other networking arrangement. Due to the ever-changing nature of computers and networks, the description of system 10 depicted in FIG. 1 is intended only as a specific example for purposes of illustrating some implementations. Many other configurations of system 10 are possible having more or fewer components than the computer system depicted in FIG. 1.

Implementations discussed hereinafter may include one or more methods implementing various combinations of the functionality disclosed herein. Other implementations may include a non-transitory computer readable storage medium storing instructions executable by a processor to perform a method such as one or more of the methods described herein. Still other implementations may include an apparatus including memory and one or more processors operable to execute instructions, stored in the memory, to perform a method such as one or more of the methods described herein.

Various program code described hereinafter may be identified based upon the application within which it is implemented in a specific implementation. However, it should be appreciated that any particular program nomenclature that follows is used merely for convenience. Furthermore, given the endless number of manners in which computer programs may be organized into routines, procedures, methods, modules, objects, and the like, as well as the various manners in which program functionality may be allocated among various software layers that are resident within a typical computer (e.g., operating systems, libraries, API's, applications, applets, etc.), it should be appreciated that some implementations may not be limited to the specific organization and allocation of program functionality described herein.

Furthermore, it will be appreciated that the various operations described herein that may be performed by any program code, or performed in any routines, workflows, or the like, may be combined, split, reordered, omitted, performed sequentially or in parallel and/or supplemented with other techniques, and therefore, some implementations are not limited to the particular sequences of operations described herein.

Distributed Voice Input Processing Environment

Figure 2:
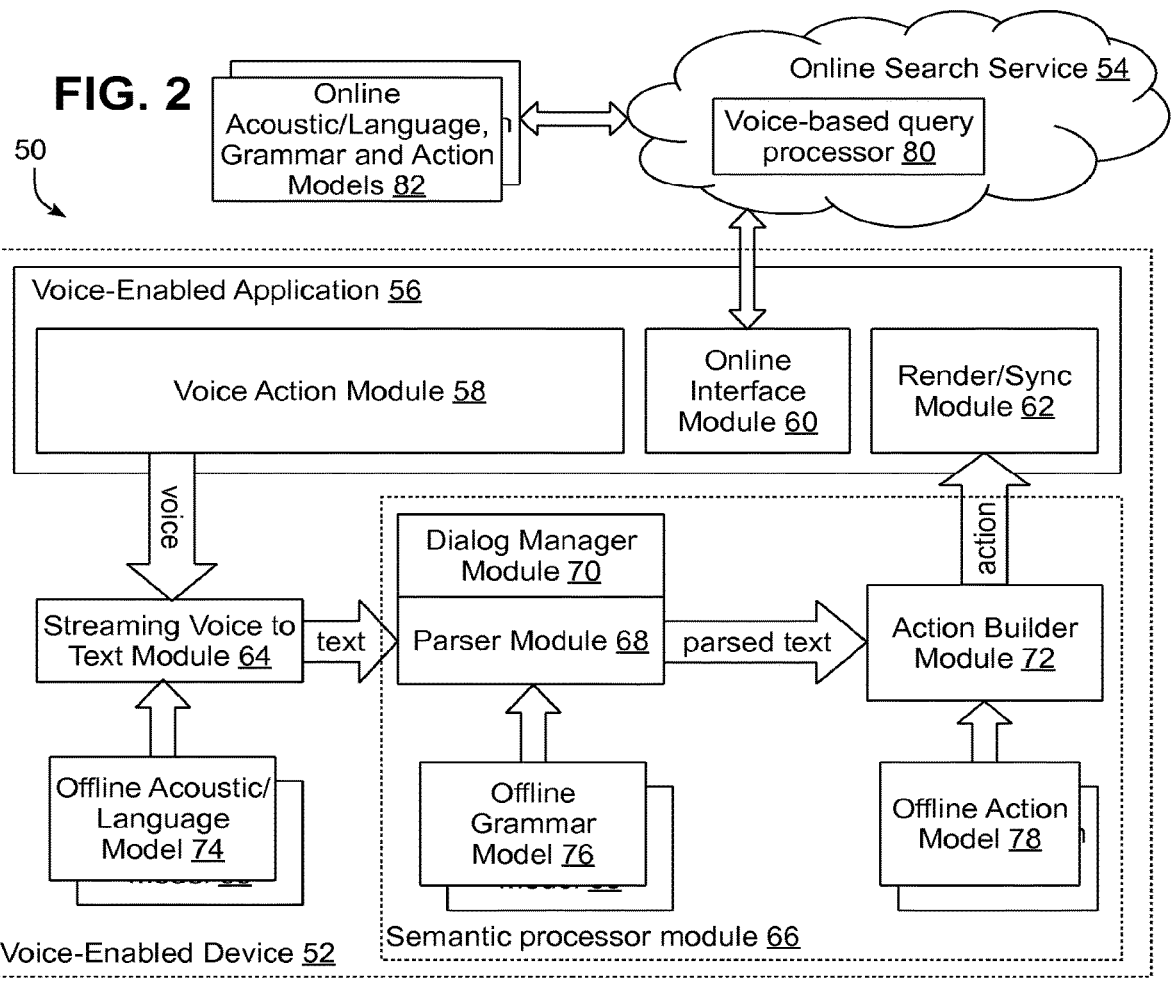
FIG. 2 is a block diagram of an example distributed voice input processing environment.

FIG. 2 illustrates an example distributed voice input processing environment 50, e.g., for use with a voice-enabled device 52 in communication with an online service such as online search service 54. In the implementations discussed hereinafter, for example, voice-enabled device 52 (also referred to herein as a voice-enabled electronic device) is described as a mobile device such as a cellular phone or tablet computer. Other implementations may utilize a wide variety of other voice-enabled devices, however, so the references hereinafter to mobile devices are merely for the purpose of simplifying the discussion hereinafter. Countless other types of voice-enabled devices may use the herein-described functionality, including, for example, laptop computers, watches, head-mounted devices, virtual or augmented reality devices, other wearable devices, audio/video systems, navigation systems, automotive and other vehicular systems, etc. Moreover, many of such voice-enabled devices may be considered to be resource-constrained in that the memory and/or processing capacities of such devices may be constrained based upon technological, economic or other reasons, particularly when compared with the capacities of online or cloud-based services that can devote virtually unlimited computing resources to individual tasks. Some such devices may also be considered to be offline devices to the extent that such devices may be capable of operating "offline" and unconnected to an online service at least a portion of time, e.g., based upon an expectation that such devices may experience temporary network connectivity outages from time to time under ordinary usage.

Online search service 54 in some implementations may be implemented as a cloud-based service employing a cloud infrastructure, e.g., using a server farm or cluster of high performance computers running software suitable for handling high volumes of requests from multiple users. In the illustrated implementation, online search service 54 is capable of querying one or more databases to locate requested information, e.g., to provide a list of web sites including requested information. Online search service 54 may not be limited to voice-based searches, and may also be capable of handling other types of searches, e.g., text-based searches, image-based searches, etc. In other implementations, an online system need not necessarily handle searching, and may be limited to handling voice-based requests for non-search actions such as setting alarms or reminders, managing lists, initiating communications with other users via phone, text, email, etc., or performing other actions that may be initiated via voice input. For the purposes of this disclosure, voice-based requests and other forms of voice input may be collectively referred to as voice-based queries, regardless of whether the voice-based queries seek to initiate a search, pose a question, issue a command, etc. In general, therefore, any voice input, e.g., including one or more words or phrases, may be considered to be a voice-based query within the context of the illustrated implementations.

In the implementation of FIG. 2, voice input received by voice-enabled device 52 is processed by a voice-enabled application (or "app") 56, which in some implementations may be a search application. In other implementations, voice input may be handled within an operating system or firmware of a voice-enabled device. Application 56 in the illustrated implementation includes a voice action module 58, online interface module 60 and render/synchronization module 62. Voice action module 58 receives voice input directed to the application and coordinates the analysis of the voice input and performance of one or more actions for a user of the voice-enabled device 52. Online interface module 60 provides an interface with online search service 54, including forwarding voice input to service 54 and receiving responses thereto. Render/synchronization module 62 manages the rendering of a response to a user, e.g., via a visual display, spoken audio, or other feedback interface suitable for a particular voice-enabled device. In addition, in some implementations, module 62 also handles synchronization with online search service 54, e.g., whenever a response or action affects data maintained for the user in the online search service (e.g., where voice input requests creation of an appointment that is maintained in a cloud-based calendar).

Application 56 relies on various middleware, framework, operating system and/or firmware modules to handle voice input, including, for example, a streaming voice to text module 64 and a semantic processor module 66 including a parser module 68, dialog manager module 70 and action builder module 72.

Module 64 receives an audio recording of voice input, e.g., in the form of digital audio data, and converts the digital audio data into one or more text words or phrases (also referred to herein as tokens). In the illustrated implementation, module 64 is also a streaming module, such that voice input is converted to text on a token-by-token basis and in real time or near-real time, such that tokens may be output from module 64 effectively concurrently with a user's speech, and thus prior to a user enunciating a complete spoken request. Module 64 may rely on one or more locally-stored offline acoustic and/or language models 74, which together model a relationship between an audio signal and phonetic units in a language, along with word sequences in the language. In some implementations, a single model 74 may be used, while in other implementations, multiple models may be supported, e.g., to support multiple languages, multiple speakers, etc.

Whereas module 64 converts speech to text, module 66 attempts to discern the semantics or meaning of the text output by module 64 for the purpose or formulating an appropriate response. Parser module 68, for example, relies on one or more offline grammar models 76 to map text to particular actions and to identify attributes that constrain the performance of such actions, e.g., input variables to such actions. In some implementations, a single model 76 may be used, while in other implementations, multiple models may be supported, e.g., to support different actions or action domains (i.e., collections of related actions such as communication-related actions, search-related actions, audio/visual-related actions, calendar-related actions, device control-related actions, etc.)

As an example, an offline grammar model 76 may support an action such as "set a reminder" having a reminder type parameter that specifies what type of reminder to set, an item parameter that specifies one or more items associated with the reminder, and a time parameter that specifies a time to activate the reminder and remind the user. Parser module 64 may receive a sequence of tokens such as "remind me to," "pick up," "bread," and "after work" and map the sequence of tokens to the action of setting a reminder with the reminder type parameter set to "shopping reminder," the item parameter set to "bread" and the time parameter of "5:00 pm,", such that at 5:00 pm that day the user receives a reminder to "buy bread."

Parser module 68 may also work in conjunction with a dialog manager module 70 that manages a dialog with a user. A dialog, within this context, refers to a set of voice inputs and responses similar to a conversation between two individuals. Module 70 therefore maintains a "state" of a dialog to enable information obtained from a user in a prior voice input to be used when handling subsequent voice inputs. Thus, for example, if a user were to say "remind me to pick up bread," a response could be generated to say "ok, when would you like to be reminded?" so that a subsequent voice input of "after work" would be tied back to the original request to create the reminder.

Action builder module 72 receives the parsed text from parser module 68, representing a voice input interpretation and generates an action along with any associated parameters for processing by module 62 of voice-enabled application 56. Action builder module 72 may rely on one or more offline action models 78 that incorporate various rules for creating actions from parsed text. In some implementations, for example, actions may be defined as functions F such that $F(I_T)=A_U$, where T represents the type of the input interpretation and U represents the type of output action. F may therefore include a plurality of input pairs (T, U) that are mapped to one another, e.g., as $f(i_t)=a_u$, where $i_t$ is an input proto variable of type t, and $a_u$ is an output modular argument or parameter of type u. It will be appreciated that some parameters may be directly received as voice input, while some parameters may be determined in other manners, e.g., based upon a user's location, demographic information, or based upon other information particular to a user. For example, if a user were to say "remind me to pick up bread at the grocery store," a location parameter may not be determinable without additional information such as the user's current location, the user's known route between work and home, the user's regular grocery store, etc.

It will be appreciated that in some implementations models 74, 76 and 78 may be combined into fewer models or split into additional models, as may be functionality of modules 64, 68, 70 and 72. Moreover, models 74-78 are referred to herein as offline models insofar as the models are stored locally on voice-enabled device 52 and are thus accessible offline, when device 52 is not in communication with online search service 54.

Furthermore, online search service 54 generally includes complementary functionality for handling voice input, e.g., using a voice-based query processor 80 that relies on various acoustic/language, grammar and/or action models 82. It will be appreciated that in some implementations, particularly when voice-enabled device 52 is a resource-constrained device, voice-based query processor 80 and models 82 used thereby may implement more complex and computationally resource-intensive voice processing functionality than is local to voice-enabled device 52. In other implementations, however, no complementary online functionality may be used.

In some implementations, both online and offline functionality may be supported, e.g., such that online functionality is used whenever a device is in communication with an online service, while offline functionality is used when no connectivity exists. In other implementations different actions or action domains may be allocated to online and offline functionality, and while in still other implementations, online functionality may be used only when offline functionality fails to adequately handle a particular voice input.

Figure 3:
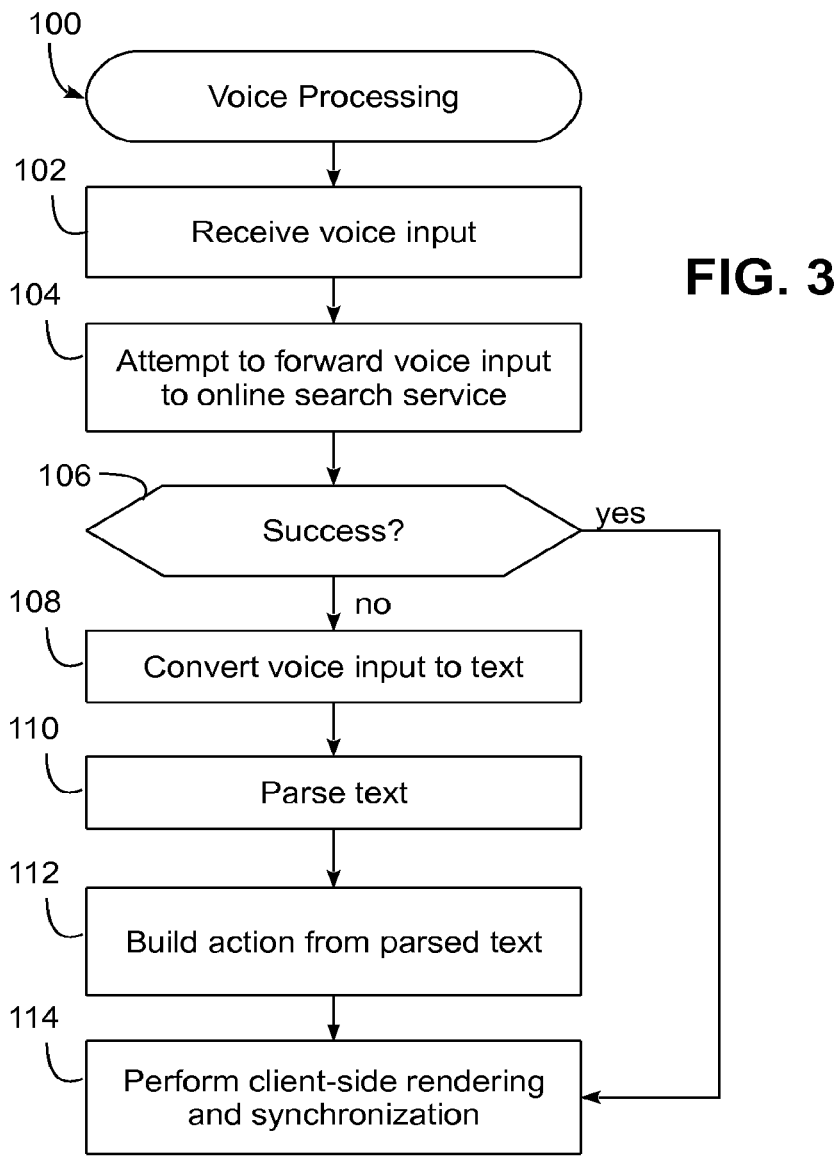
FIG. 3 is a flowchart illustrating an example method of processing a voice input using the environment of FIG. 2.

FIG. 3, for example, illustrates a voice processing routine 100 that may be executed by voice-enabled device 52 to handle a voice input. Routine 100 begins in block 102 by receiving voice input, e.g., in the form of a digital audio signal. In this implementation, an initial attempt is made to forward the voice input to the online search service (block 104). If unsuccessful, e.g., due to the lack of connectivity or the lack of a response from the online search service, block 106 passes control to block 108 to convert the voice input to text tokens (block 108, e.g., using module 64 of FIG. 2), parse the text tokens (block 110, e.g., using module 68 of FIG. 2), and build an action from the parsed text (block 112, e.g., using module 72 of FIG. 2). The resulting action is then used to perform client-side rendering and synchronization (block 114, e.g., using module 62 of FIG. 2), and processing of the voice input is complete.

Returning to block 106, if the attempt to forward the voice input to the online search service is successful, block 106 bypasses blocks 108-112 and passes control directly to block 114 to perform client-side rendering and synchronization. Processing of the voice input is then complete. It will be appreciated that in other implementations, as noted above, offline processing may be attempted prior to online processing, e.g., to avoid unnecessary data communications when a voice input can be handled locally.

Context-Sensitive Dynamic Update of Voice To Text Model in a Voice-Enabled Electronic Device In some implementations, a voice to text model used by a voice-enabled electronic device, e.g., a voice to text module therein, may be dynamically updated based in part on the context of a voice action detected in a voice input from a user to better configure the voice to text model to recognize particular entities that may be relevant to that context.

It will be appreciated that various voice-enabled electronic devices may rely to different extents on online and offline functionality to implement a voice-based user interface. Some devices, for example, may prioritize the use of online services to perform many of the operations associated with processing voice input, in part because online voice-based query processors are generally capable of devoting comparatively greater processing resources to handle voice-based queries. One of the functions that may be performed by an online service is semantic processing, which processes text elements (also referred to as tokens) generated from digital audio data to attempt to determine an action that is being requested by a user via a voice-based query. In some instances, a digital audio signal may even be provided to an online service such that both semantic processing and voice to text conversion are performed in remotely from the device.

Due to the potential for connectivity issues with such devices, as well as the general latency that may be experienced even when connectivity issues are not present, it may also be desirable in some instances to incorporate local or offline processing functionality, including both voice to text and semantic processing functionality, within a voice-enabled electronic device. In a resource-constrained environment such as a mobile device, however, the capabilities of handling voice to text and semantic processing locally on a voice-enabled electronic device may be reduced compared to those of online services. Also, as noted above in connection with FIG. 2, local or offline processing may also incorporate a streaming architecture to dynamically build voice actions from voice inputs as users speak, rather than waiting until a complete voice input has been received before attempting to derive a meaning from the voice input, which in some instances may reduce the latency associated with generating a voice action from a voice input submitted by a user.

It has been found that one particularly problematic area arising due to resource constraints associated with local processing functionality relates to the recognition of proper names, which generally occur with much less frequency but with much greater variety than other grammatical terms. For online services, the voice to text models and engines that are used to recognize words and phrases in a digital audio signal may be large and computationally expensive to ensure that as many different proper names can be recognized as possible. The resource constraints of many voice-enabled electronic devices, however, from a practical perspective may limit the number of proper names that can be supported by local voice to text functionality.

Local or offline voice to text functionality, e.g., as implemented in a voice to text module such as streaming voice to text module 64 of device 50 in FIG. 2, generally may rely on one or more voice to text models stored in the device, e.g., one or more offline acoustic/language models 74. As noted above, such functionality generally receives an audio recording of voice input, e.g., in the form of digital audio data, and converts the digital audio data into one or more text tokens. The model or models used by such functionality, each of which may be considered to be a voice to text model, generally model the relationship between an audio signal and phonetic units in a language, along with word sequences in the language. Models may also be specific to particular languages in some implementations. In some implementations, voice to text models may be acoustic models, language models, pronunciation models, etc., as well as models combining functionality of one or more of such models. In some implementations, for example, voice to text models may be implemented as finite state decoding graphs including a plurality of paths or pathways.

In order to generate a text token for a spoken word or phrase in digital audio data, that work or phrase generally must be within the vocabulary of the model or models utilized by a voice to text module. As such, generally the size of the model(s), as well as the processing overhead associated with using the model(s) (e.g., to traverse through a finite state decoding graph), increase in conjunction with an increase in the vocabulary supported by the model(s). Consequently, given the resource constraints of some voice-enabled electronic devices, the vocabularies supported by the local or offline voice to text functionality are likewise constrained.

It has been found, however, that the streaming architectures utilized in some voice-enabled electronic devices may be used in some implementations to dynamically update one or more local or offline voice to text models to effectively expand the supported vocabularies of such models in a context-sensitive manner based upon partially processed voice inputs, and thereby enable such models to better recognize particular entities that are likely to be included subsequently within such voice inputs. In some implementations, for example, a streaming semantic processor may provide feedback to a streaming voice to text module to enable one or more models used by the voice to text module to be dynamically updated to recognize one or more entities that are related to a current context of a partially-completed voice action.

Consider, for example, a scenario where a user wishes to place a phone call to a friend, and speaks the voice input "call Seamus." In a resource-constrained voice-enabled electronic device, the local voice to text functionality in the device may not ordinarily include the name "Seamus" in its vocabulary, and as such, may be incapable of recognizing the name without online assistance, or may improperly recognize the name (e.g., as the phrase "shame us). In some implementations, however, a streaming architecture may be relied upon such that, upon voice to text and semantic processing of the word "call," a determination may be made by the semantic processing functionality that the user is intending to place a call with the mobile device, and in response to that determination, it may be predicted that the name of a contact may be forthcoming in the voice input. As such, a voice to text model may be dynamically updated to specifically recognize the names of the contacts in the user's contact list, thereby increasing the likelihood that the upcoming name in the voice input ("Seamus") will be properly recognized during voice to text conversion.

As such, various implementations may effectively and dynamically augment the vocabulary supported by a voice to text module based upon context-sensitive information derived from one portion of a voice input in order to improve the recognition capabilities of the module when processing another portion of the voice input.

Figure 4:
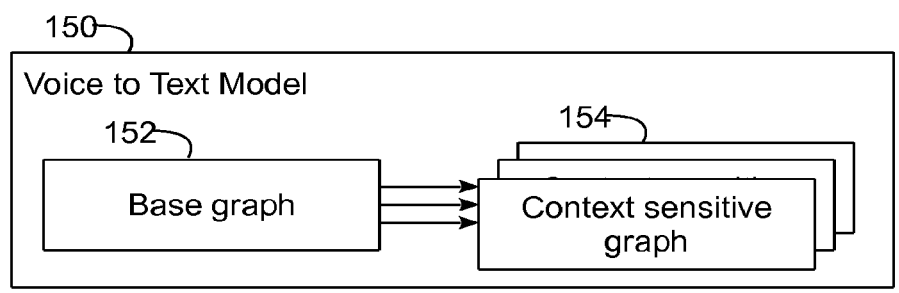
FIG. 4 is a block diagram illustrating an example implementation of a dynamically updatable voice to text model suitable for use by the streaming voice to text module referenced in FIG. 2.

While a voice to text model may be dynamically updated in a number of alternative manners, FIG. 4 illustrates an example dynamically-updatable voice to text model 150. Model 150 may implement, for example, a finite state decoding graph defining a plurality of paths mapping digital audio data to text words or phrases. In one implementation, model 150 may include a base graph 152 that is selectively coupled to a plurality of context-sensitive graphs 154. Base graph 152 may support a primary vocabulary for the voice-enabled electronic device that includes the most common words and phrases likely to be spoken by a user. Context-sensitive graphs 154, on the other hand, may include paths for one or more words or phrases, also referred to herein as context sensitive entities, that when incorporated into model 150, effectively augment the vocabulary of the local voice to text module of the device for a particular context. The manner in which graphs 154 may be integrated with graph 152 may vary in different implementations, e.g., based upon the manner in which paths are encoded into a graph. Further, in some implementations, a common interface may be used to enable context-sensitive graphs 154 to be selectively and dynamically added to and removed from model 150, and in some implementations, various algorithms (e.g., a least recently used algorithm) may be used to swap out context-sensitive graphs and thereby maintain the model at an overall size and complexity that is consistent with the resource constraints of the device.

A context, in this regard, may refer in some implementations to a context sensitive parameter of a voice action, e.g., a partially built voice action derived from an initial portion of a voice input. In some implementations, a first portion of a voice input may be locally processed by a device to determine a type or category of voice action, and then based upon the determined type or category, one or more parameters of that voice action may be assessed to determine whether the parameters are context sensitive parameters, which in the context of the disclosure are parameters for which context sensitive entities (i.e., words and/or phrases) suitable for augmenting a local voice to text model may exist.

Context-sensitive graphs, or other data suitable for dynamically updating a voice to text model, which is referred to hereinafter as voice to text model update data, may be obtained in a number of manners in different implementations. For example, in some implementations, voice to text model update data may be stored locally in a voice-enabled electronic device and loaded into the model as needed. In some implementations, voice to text model update data may be retrieved or prefetched from an online service and loaded into the model as needed. In some implementations, voice to text model update data may be generated dynamically by a voice-enabled electronic device or an online service. Further, in some implementations, a voice to text model may be dynamically updated by dynamically training the model to recognize various context sensitive entities. In addition, it will be appreciated that voice to text model update data may be compressed in some implementations to minimize storage space and/or communication costs, and decompressed when dynamically updating a voice to text model.

In some implementations, local processing of at least a portion of a voice input received by a voice-enabled electronic device may be performed to dynamically build at least a portion of a voice action prior to completely receiving the voice input with the voice-enabled electronic device. During the local processing, a determination may be made as to whether the voice action is associated with a context sensitive parameter, and in response to a determination that the voice action is associated with the context sensitive parameter, a dynamic update to a local voice to text model used by the voice-enabled electronic device may be initiated to facilitate recognition of a plurality of context sensitive entities associated with the context sensitive parameter.

In addition, in some implementations, a voice input may be received with a voice-enabled electronic device, and voice to text conversion may be performed locally in the voice-enabled electronic device using a local voice to text model to generate text for a first portion of the voice input, the local voice to text model may be dynamically updated after generating the text for the first portion of the voice input to facilitate recognition of a plurality of context sensitive entities associated with a context sensitive parameter for a voice action associated with the voice input, and thereafter voice to text conversion may be performed locally in the voice-enabled electronic device using the dynamically updated local voice to text model to generate text for a second portion of the voice input.

The types of context sensitive entities that may be dynamically incorporated into a voice to text model will generally vary depending upon the voice action, and thus any context associated therewith, e.g., one or more context sensitive parameters. In some implementations, for example, a voice action may be a request to play a media item, and one or more of the parameters of such an action may be various types of media item identifiers for use in identifying one or more media items, e.g., by requesting playback of a song, a video, a show, a movie, or other media item based upon a title, an artist, a genre, a playlist, an album, an actor, or other identifier. Context sensitive entities that may be dynamically incorporated into a voice to text model may therefore be based upon those entities that could potentially be spoken by the user, and as such, may be based, for example, on media items stored on the device, media items in an online or offline library of the user, media items previously purchased, played, or viewed by the user, media items similar to or recommended to the user based upon analysis of a user's purchase and/or playback history, etc.

In some implementations, a voice action may be a request to communicate with a contact (e.g., via phone call, text message, email, chat message, video call, etc.), and one or more of the parameters of such an action may be various types of contact identifiers for use in communicating with an individual, e.g., a first name, a last name, a nickname, a relationship identifier, etc. Context sensitive entities that may be dynamically incorporated into a voice to text model may therefore be based upon those entities that could potentially be spoken by the user, e.g., as collected from contacts stored locally on a user's device or accessible via an online service.

Further, in some implementations, a voice action may be a navigation action, a location-dependent search, or other action that may be associated with a location-dependent parameter. Context sensitive entities that may be dynamically incorporated into a voice to text model may therefore be based upon those entities that could potentially be spoken by the user, e.g., identifiers for various points of interest disposed in proximity to a predetermined location, e.g., a current location of a voice-enabled electronic device, which may be retrieved from a local database on the device, or from an online service. In one example implementation, for example, a user may speak a request to "make a reservation at," and upon determining that the associated voice action is a request to make a reservation at a restaurant, the current location of the device may be forwarded to an online service to prefetch voice to text model update data identifying restaurants near the current location, prefetch identifiers for different cuisines, etc. Other voice actions, and other context sensitive parameters, may be handled in a similar manner.

Now turning to FIGS. 5-9, an example implementation is disclosed for processing voice input in device 50 of FIG. 2 using a streaming architecture, and incorporating functionality for performing a dynamic and context-sensitive update to a local voice to text model. In particular, a number of routines executable by voice action module 58, streaming voice to text module 64 and sematic processor module 66 are disclosed.

Figure 5:
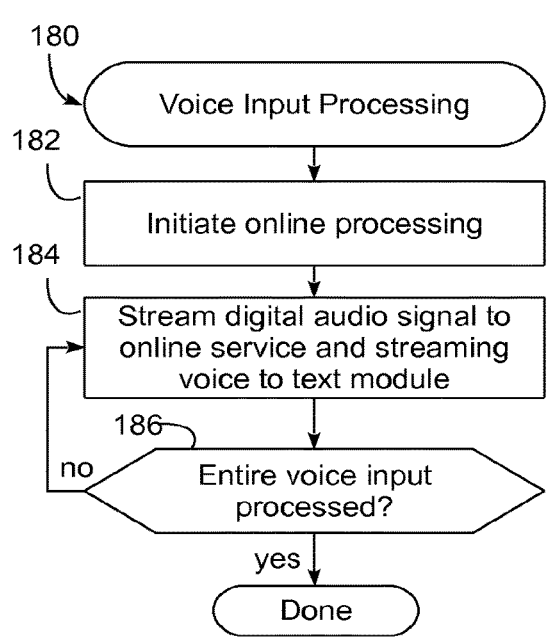
FIG. 5 is a flowchart illustrating another example method of processing a voice input using the environment of FIG. 2.

FIG. 5, for example, illustrates an example voice input processing routine 180 executed by voice action module 58 in response to receipt of at least a portion of a voice input. Routine 180 begins in block 182 by initiating online processing, e.g., by sending a request to the online service, e.g., to voice-based query processor 80 of online search service 54, indicating that a voice unit will be forthcoming from the device. Next, in block 184, digital audio data associated with a first portion of the voice input is streamed both to the online service and to the offline voice to text module (streaming voice to text module 64). Block 186 determines whether the entire voice input has been processed, and if not, returns control to block 184 to stream additional digital audio data to the online service and to the offline voice to text module. Once the entire voice input has been processed, routine 180 is complete.

It will be appreciated that in some implementations, online processing may not be initiated, and in some implementations, offline processing may only be performed when no network connectivity exists. In other implementations, voice to text conversion may be performed locally such that rather than streaming digital audio data to the online service, text tokens output by the voice to text module are streamed to the online service.

Figure 6:
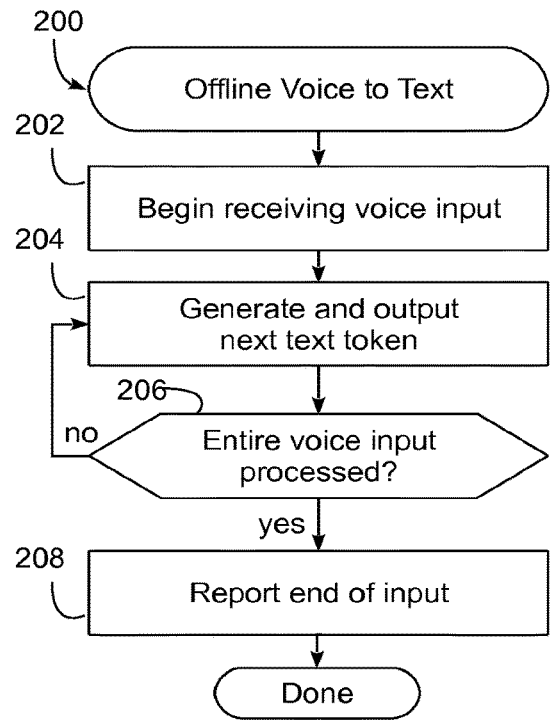
FIG. 6 is a flowchart of an example offline voice to text routine executed by the streaming voice to text module referenced in FIG. 2.

FIG. 6 next illustrates an example offline voice to text routine 200 executed by streaming voice to text module 64. As noted above, module 64 receives digital audio data representative of portions of a voice input from voice action module 58, and as such, routine 200 begins in block 202 by beginning to receive voice input from module 58. Block 204 generates and outputs text tokens (e.g., words and/or phrases) recognized in the digital audio data of the voice input, and based upon one or more voice to text models 74 resident in the device. Block 206 then determines whether an entire voice input has been processed, e.g., when no further digital audio data of the voice input remains unprocessed. While more digital audio data remains unprocessed, block 206 returns control to block 204 to generate additional text tokens, and when the entire voice input has been processed, block 206 passes control to block 208 to report the end of the voice input, e.g., to semantic processor module 66. In other implementations, the end of voice input may instead be reported by voice action module 58 or other functionality in the device. Routine 200 is then complete.

Figure 7:
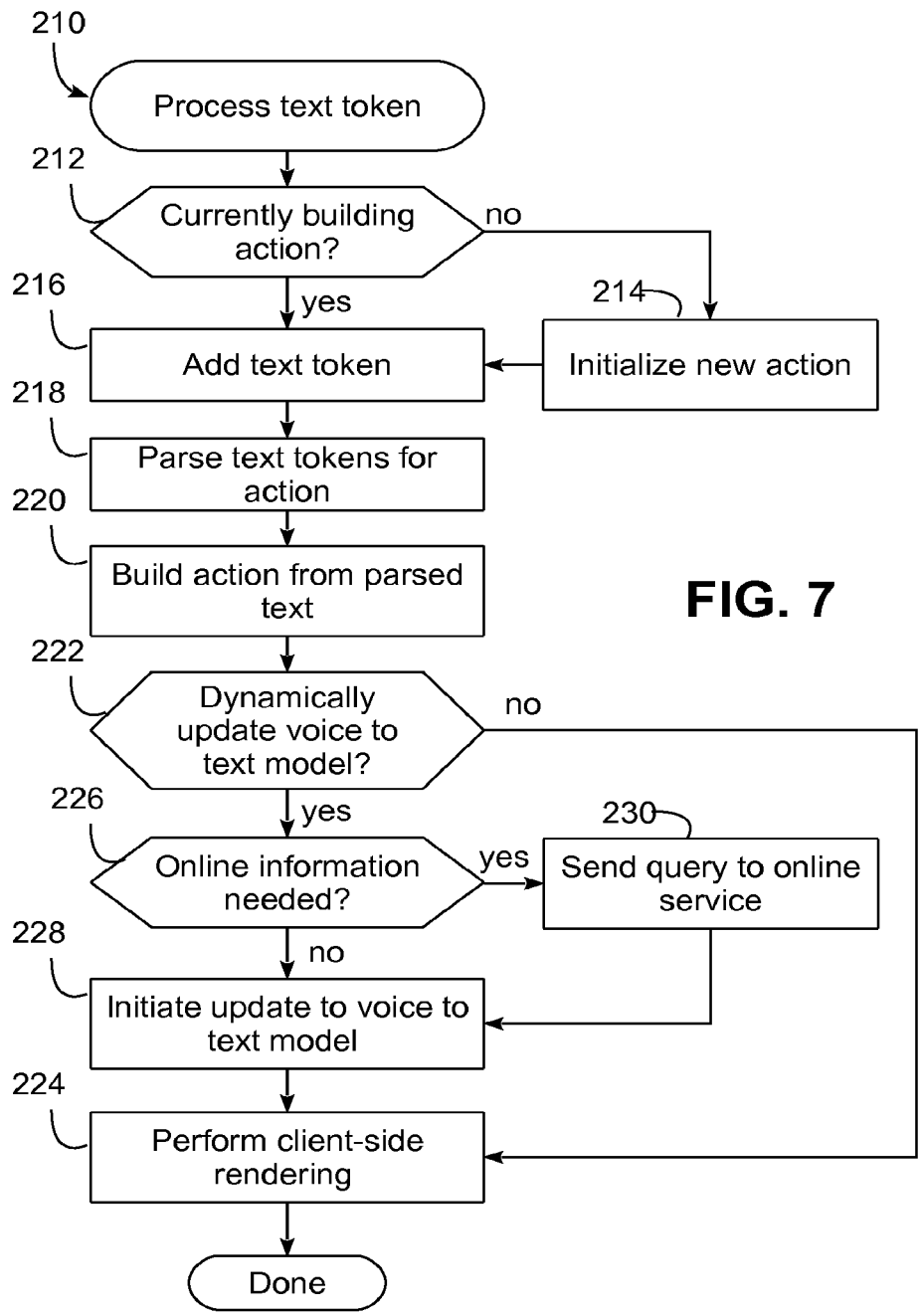
FIG. 7 is a flowchart of an example process text token routine executed by the semantic processor module referenced in FIG. 2.

FIG. 7 next illustrates an example process text token routine 210 executed by semantic processor module 66 in response to receiving a text token from streaming voice to text module 64. Routine 210 begins in block 212 by determining whether module 66 is currently building a voice action. If not, control passes to block 214 to initialize a new action object. After a new action object is initialized in block 214, or if block 212 determines that an action is already currently in the process of being built, block 216 adds the text token to a set of text token associated with the action. Block 218 parses the text tokens for the action and block 220 attempts to build the action from the parsed text. As noted above, in the illustrated implementation a streaming architecture is employed that attempts to progressively and dynamically build an action based upon the information currently available to the semantic processor module. As such, blocks 218 and 220 in some implementations may build, revise, refine, revise, correct, etc. an action as additional text tokens are supplied to the semantic processor module. Further, blocks 218 and 220 may in some implementations determine what action is being requested, determine the values of one or more parameters for the action, and even determine when additional data may be needed in order to complete the action.

Next, block 222 determines whether, based upon the current information available, a voice to text model should be dynamically updated. For example, if the voice action is determined to be of a type or category for which a dynamic update may be useful (e.g., for the aforementioned media play, communicate contact, and location-based actions), block 222 may initiate a dynamic update. As another example, one or more parameters of a voice action may indicate an opportunity for improving a voice to text model.

If no decision is made to perform a dynamic update, block 222 passes control to block 224 to perform client-side rendering on the device. For example, client-side rendering may include displaying the text spoken by the user on a display of the device, altering previously-displayed text based upon an update to the partially-built action resulting from the text token being processed, or other audio and/or visual updates as may be appropriate for the particular device. Routine 210 is then complete for that text token.

Returning to block 222, if a decision is made to perform a dynamic update, control passes to block 226 to determine whether online information is needed to perform the dynamic update. As noted above, in some instances, voice to text model update data may be stored locally on a device, or may be generated from other data on a device, whereby no online information may be needed to perform a dynamic update. Thus, if no online information is needed, block 226 passes control to block 228 to initiate a dynamic update to a voice to text model used by streaming voice to text module 64, e.g., by communicating feedback in the form of an update request to module 64. Control then passes to block 224 to perform client-side rendering, and routine 210 is complete. If, however, online information is needed, block 226 instead passes control to block 230 to send a query to the online service to prefetch voice to text model update data from the online service, which then proceeds to blocks 228 and 224 to initiate the dynamic update and perform client-side rendering. Routine 210 is then complete.

Figure 8:
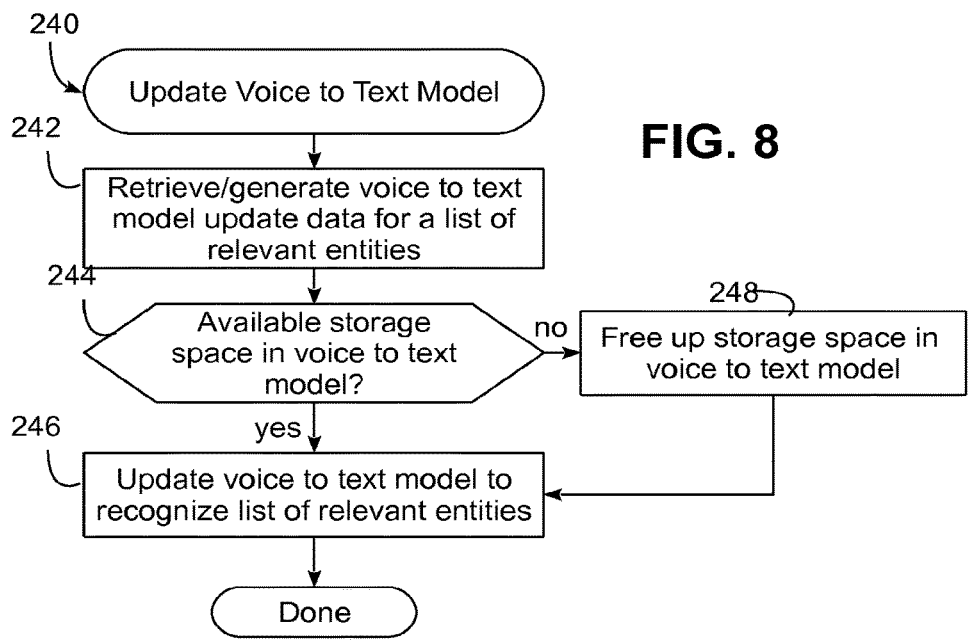
FIG. 8 is a flowchart of an example update voice to text model routine executed by the streaming voice to text module referenced in FIG. 2.

FIG. 8 next illustrates an example update voice to text model routine 240 that may be executed by streaming voice to text module 64 in response to a notification from semantic processor module 66. Routine 240 begins in block 242 be retrieving and/or generating voice to text model update data for a list of relevant context sensitive entities, whether from local storage or an online storage. Block 244 then determines whether there is sufficient available storage space in the voice to text model, e.g., in an amount of storage space allocated to the model. If so, control passes to block 246 to dynamically update the voice to text model to recognize the list of relevant context sensitive entities, e.g., by training the model, incorporating paths associated with the entities into the model, or in other manners. Routine 240 is then complete.

Returning to block 244, if insufficient available storage space exists, control passes to block 248 to free up storage space in the voice to text model, e.g., by discarding model data related to other context sensitive entities. Various algorithms may be used to determine how to free up storage space. For example, a least recently used or least recently added algorithm may be used in some implementations to discard model data for entities that have not been recently used or that were added to the model the earliest. Control then passes to block 246 to update the voice to text model, and routine 240 is complete.

Figure 9:
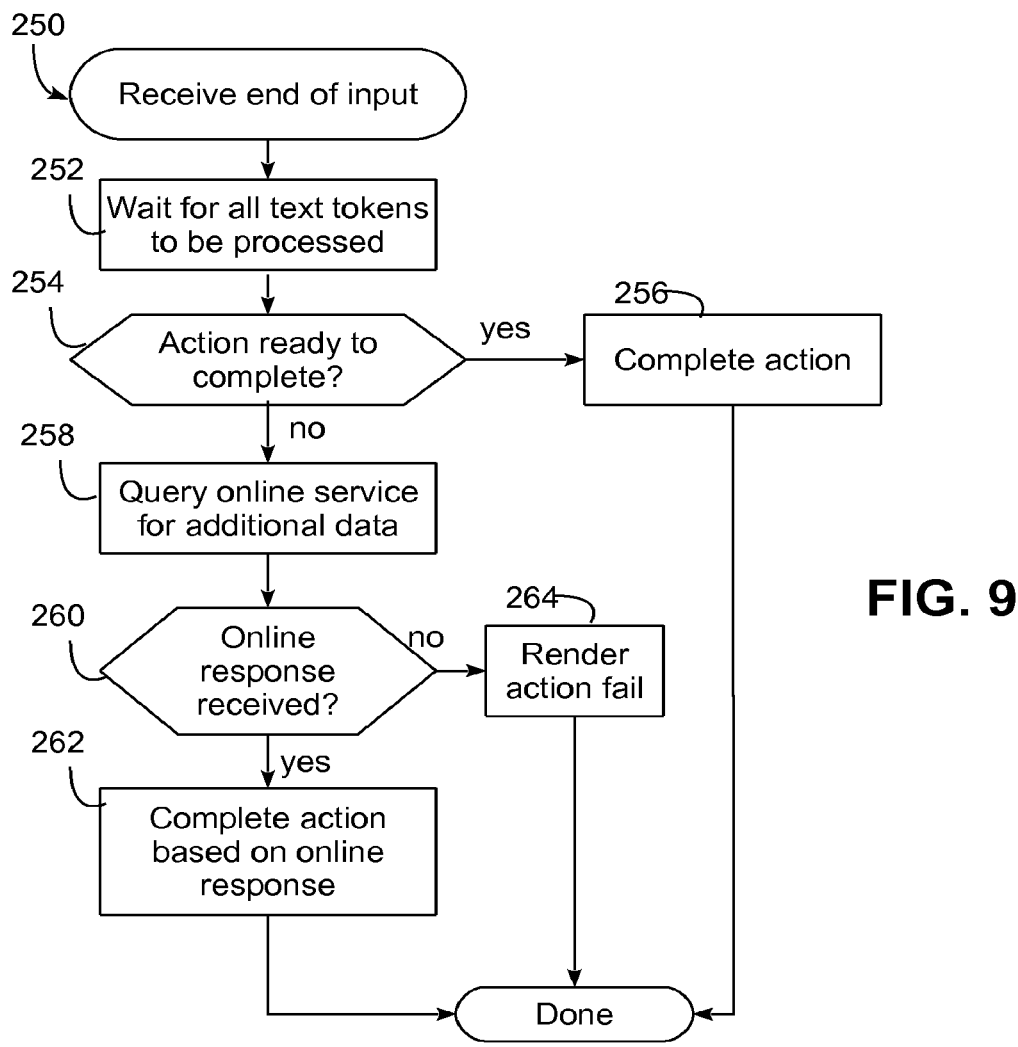
FIG. 9 is a flowchart of an example receive end of input routine executed by the semantic processor module referenced in FIG. 2.

FIG. 9 next illustrates an example receive end of input routine 250 that may be executed by semantic processor module 66 in response to receipt of an end of input indication (e.g., as generated in block 208 of FIG. 6). Routine 250 begins in block 252 by waiting (if necessary) for all text tokens to complete processing by routine 210, indicating that the semantic processor has processed all text tokens for the voice input. Block 254 then determines whether the action is ready to complete. In some implementations, an action may be determined to be ready to complete if it is determined that no additional local or online processing is required in order to complete the action.

If so, control passes to block 256 to complete the action, and routine 250 is complete. If not, control passes to block 258 to query the online service for additional data needed in order to complete the action. Block 260 determines whether the online response has been received within an appropriate time, and if so, passes control to block 262 to complete the action based upon the data provided by the online response. For example, if the online response includes an online voice action, block 262 may complete the action by performing the operations specified by the online voice action. Otherwise, if the online response includes additional information requested by device, block 262 may complete the action by incorporating the additional information into the partially-built action built by semantic processor module 66 to generate a fully-built voice action.

Once the action is completed in block 262, routine 250 is complete. In addition, returning to block 260, if no response is received in a timely manner, control passes to block 264 to render to the user a failure in the action, e.g., by notifying the user that the requested action was not completed, and terminating routine 230.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

What is claimed is:

1. A method, comprising:
receiving a voice input with a voice-enabled electronic device, the voice input including an original request that includes first and second portions, the second portion including a first context sensitive entity among a plurality of context sensitive entities that are associated with a context sensitive parameter; and
in the voice-enabled electronic device, and responsive to receiving the first portion of the voice input:
performing local processing of the first portion of the voice input;
determining during the local processing that the first portion is associated with the context sensitive parameter;
in response to determining that the first portion is associated with the context sensitive parameter, and prior to performing local processing of the second portion of the voice input including the first context sensitive entity:
dynamically updating a local voice to text model, used by the voice-enabled electronic device, wherein dynamically updating the local voice to text model facilitates recognition of the first context sensitive entity in performing local processing of the second portion of the voice input;
generating, utilizing the dynamically updated local voice to text model, a recognition of the second portion of the voice input; and
causing performance of a voice action that is based on the recognition of the second portion of the voice input.

2. The method of claim 1, wherein performing the local processing includes:
converting a digital audio signal of the voice input to text using a streaming voice to text module of the voice-enabled electronic device, wherein the streaming voice to text module dynamically generates a plurality of text tokens from the digital audio signal.

3. The method of claim 1, wherein the local voice to text model comprises at least one decoding graph, and wherein dynamically updating the local voice to text model comprises adding a decoding path to the at least one decoding graph corresponding to each of the plurality of context sensitive entities.

4. The method of claim 1, further comprising, in response to a determination that the first portion is associated with the context sensitive parameter, prefetching from an online service voice to text model update data associated with the plurality of context sensitive entities, wherein dynamically updating the local voice to text model includes communicating the prefetched voice to text model update data to dynamically update the local voice to text model.

5. The method of claim 1, wherein determining during the local processing that the first portion is associated with the context sensitive parameter includes determining that the first portion includes a request to play a media item, wherein the context sensitive parameter includes a media item identifier for use in identifying the media item, and wherein the plurality of context sensitive entities identify a plurality of media items playable by the voice-enabled electronic device.

6. The method of claim 1, wherein determining during the local processing that the first portion is associated with the context sensitive parameter includes determining that the first portion includes a request to communicate with a contact, wherein the context sensitive parameter includes a contact identifier for use in initiating a communication with the contact, and wherein the plurality of context sensitive entities identify a plurality of contacts accessible by the voice-enabled electronic device.

7. The method of claim 1, wherein the context sensitive parameter is a location-dependent parameter, and wherein the plurality of context sensitive entities identify a plurality of points of interest disposed in proximity to a predetermined location.

8. The method of claim 7, wherein the predetermined location comprises a current location of the voice-enabled electronic device, the method further comprising, in response to a determination that the first portion is associated with the context sensitive parameter, communicating the current location to an online service and prefetching from the online service voice to text model update data associated with the plurality of context sensitive entities.

9. The method of claim 1, further comprising:
building the voice action based on the recognition of the second portion of the voice input.

10. The method of claim 9, wherein building the voice action is by a streaming semantic processor of the voice-enabled electronic device.

11. The method of claim 1, wherein performance of the voice action comprises rendering, at the voice-enabled electronic device, of content that corresponds to the voice action.

12. A voice-enabled electronic device including memory and one or more processors operable to execute instructions stored in the memory, comprising instructions to:
receive a voice input, the voice input including an original request that includes first and second portions, the second portion including a first context sensitive entity among a plurality of context sensitive entities that are associated with a context sensitive parameter; and
responsive to receiving the first portion of the voice input:
perform local processing of the first portion of the voice input;
determine during the local processing that the first portion is associated with the context sensitive parameter;
in response to determining that the first portion is associated with the context sensitive parameter, and prior to performing local processing of the second portion of the voice input including the first context sensitive entity:
dynamically update a local voice to text model, used by the voice-enabled electronic device, wherein dynamically updating the local voice to text model facilitates recognition of the first context sensitive entity in performing local processing of the second portion of the voice input;
generate, utilizing the dynamically updated local voice to text model, a recognition of the second portion of the voice input; and
cause performance of a voice action that is based on the recognition of the second portion of the voice input.

13. The voice-enabled electronic device of claim 12, wherein the instructions to perform the local processing include instructions to:
convert a digital audio signal of the voice input to text using a streaming voice to text module of the voice-enabled electronic device, wherein the streaming voice to text module dynamically generates a plurality of text tokens from the digital audio signal.

14. The voice-enabled electronic device of claim 12, wherein the instructions to determine during the local processing that the first portion is associated with the context sensitive parameter include instructions to determine that the first portion includes a request to play a media item, wherein the context sensitive parameter includes a media item identifier for use in identifying the media item, and wherein the plurality of context sensitive entities identify a plurality of media items playable by the voice-enabled electronic device.

15. The voice-enabled electronic device of claim 12, wherein the context sensitive parameter is a location-dependent parameter, and wherein the plurality of context sensitive entities identify a plurality of points of interest disposed in proximity to a predetermined location.

16. The voice-enabled electronic device of claim 15, wherein the predetermined location comprises a current location of the voice-enabled electronic device, and wherein the instructions further comprise instructions to, in response to a determination that the first portion is associated with the context sensitive parameter, communicate the current location to an online service and prefetch from the online service voice to text model update data associated with the plurality of context sensitive entities.

17. The voice-enabled electronic device of claim 12, wherein the instructions further comprise instructions to:
build the voice action based on the recognition of the second portion of the voice input.

18. The voice-enabled electronic device of claim 17, wherein the instructions to build the voice action comprise instructions to use, in building the voice action, a streaming semantic processor of the voice-enabled electronic device.

19. The voice-enabled electronic device of claim 12, wherein performance of the voice action comprises rendering, at the voice-enabled electronic device, of content that corresponds to the voice action.

20. A non-transitory computer readable storage medium storing computer instructions executable by one or more processors to perform a method comprising:
receiving a voice input with a voice-enabled electronic device, the voice input including an original request that includes first and second portions, the second portion including a first context sensitive entity among a plurality of context sensitive entities that are associated with a context sensitive parameter; and
in the voice-enabled electronic device, and responsive to receiving the first portion of the voice input:
performing local processing of the first portion of the voice input;
determining during the local processing that the first portion is associated with the context sensitive parameter;
in response to determining that the first portion is associated with the context sensitive parameter, and prior to performing local processing of the second portion of the voice input including the first context sensitive entity:
dynamically updating a local voice to text model, used by the voice-enabled electronic device wherein dynamically updating the local voice to text model facilitates recognition of the first context sensitive entity in performing local processing of the second portion of the voice input;
generating, utilizing the dynamically updated local voice to text model, a recognition of the second portion of the voice input; and
causing performance of a voice action that is based on the recognition of the second portion of the voice input.

* * * * *